(12) United States Patent
Hurskainen

(10) Patent No.: US 8,047,578 B2
(45) Date of Patent: Nov. 1, 2011

(54) PIPE JOINT ARRANGEMENT

(76) Inventor: Aarne Hurskainen, Valkeakosi (FI)

( * ) Notice: Subject to any disclaimer, the term of this patent is extended or adjusted under 35 U.S.C. 154(b) by 88 days.

(21) Appl. No.: 12/442,494

(22) PCT Filed: Sep. 21, 2006

(86) PCT No.: PCT/FI2006/000307
§ 371 (c)(1),
(2), (4) Date: Mar. 23, 2009

(87) PCT Pub. No.: WO2008/034934
PCT Pub. Date: Mar. 27, 2008

(65) Prior Publication Data
US 2010/0084857 A1    Apr. 8, 2010

(51) Int. Cl.
*F16L 27/04* (2006.01)
(52) U.S. Cl. .................. 285/261; 285/274; 285/272
(58) Field of Classification Search .................. 285/274, 285/261, 272
See application file for complete search history.

(56) References Cited

U.S. PATENT DOCUMENTS

| | | | | |
|---|---|---|---|---|
| 390,240 | A | * | 10/1888 | Legat .............................. 285/261 |
| 1,005,407 | A | | 10/1911 | Brousseau |
| 1,049,438 | A | * | 1/1913 | Augustine ....................... 285/274 |
| 1,220,270 | A | * | 3/1917 | Phillips, Jr. ..................... 285/274 |
| 2,073,255 | A | * | 3/1937 | Schaetzly ....................... 285/274 |
| 2,330,568 | A | * | 9/1943 | Erickson ......................... 285/274 |
| 3,112,129 | A | * | 11/1963 | William et al. ................. 285/274 |
| 3,977,707 | A | * | 8/1976 | Oliver ............................. 285/265 |
| 4,337,970 | A | * | 7/1982 | Gunderson ..................... 285/274 |
| 4,480,857 | A | * | 11/1984 | Graves ............................ 285/265 |
| 4,643,463 | A | * | 2/1987 | Halling et al. ................. 285/265 |
| 6,651,681 | B1 | | 11/2003 | Hurskainen |

FOREIGN PATENT DOCUMENTS

EP    1672265 A1    6/2006

OTHER PUBLICATIONS

PCT/ISA/210—International Search Report—Apr. 25, 2007.
PCT/ISA/237—Written Opinion of the International Searching Authority—Apr. 25, 2007.

* cited by examiner

*Primary Examiner* — David E Bochna
(74) *Attorney, Agent, or Firm* — Venable LLP; Eric J. Franklin

(57) ABSTRACT

A pipe joint arrangement, which is intended for enabling one or more angular deflections successive in a longitudinal direction along an elongated pipeline in one or more planes. A joining piece is connectible with pipeline sections to be coupled with each other successively in the longitudinal direction and includes of frame elements locked to each other in a longitudinal direction and provided therebetween a swivel member with a substantially cylindrical or spherical swiveling face for enabling movement of the frame elements by rotating the same relative to each other with respect to one or more axes of rotation.

12 Claims, 5 Drawing Sheets

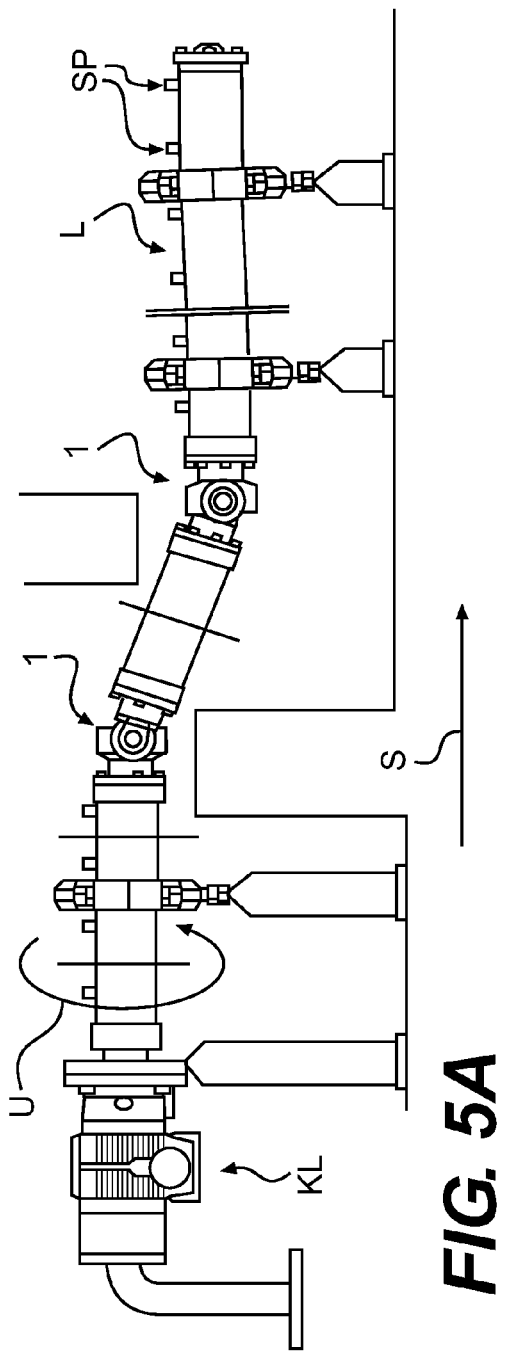
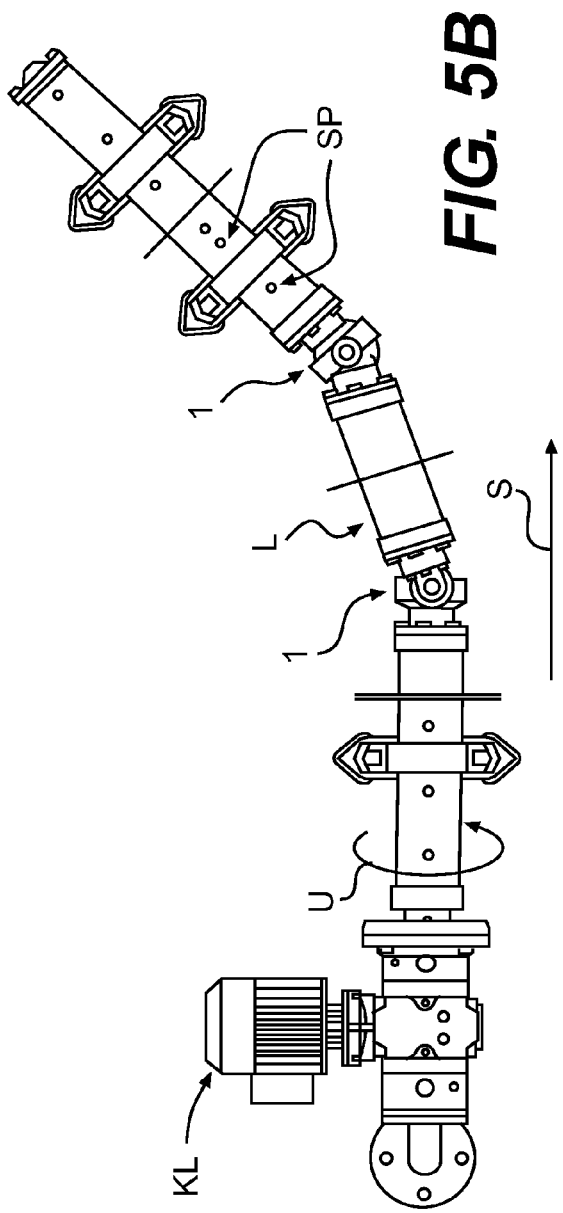

PIPE JOINT ARRANGEMENT

CROSS-REFERENCE TO RELATED APPLICATIONS

This is the national phase under 35 U.S.C. §371 of PCT/FI2006/000307 filed 21 Sep. 2006.

Field of the Invention

The invention relates to a pipe joint arrangement, which is intended for enabling one or more angular deflections successive in a longitudinal direction along an elongated pipeline in one or more planes.

BACKGROUND OF THE INVENTION

In the above purpose it is currently conventional to employ fixed elbow pieces, e.g. in various process pipelines. Such fixed pipelines call for a shutdown of the process and a disruption of the pipework in the event that, for any reason, a change of location for a pipework is desired. However, depending on how the support of a pipework is arranged, it is in some cases possible to move a pipework sufficiently in operations calling for minor displacements.

However, a particularly outstanding problem today exists in association with fixed pipelines intended for process washing, in which context the purpose to wash an industrial process, such as a process apparatus included in the basic equipment of a pulp or paper mill, by means of a wash pipe present within the same and rotating e.g. around its longitudinal axis. The wash pipe has its washing fluid supplied, preferably according to the principle shown e.g. in FIG. 5, in its entirety by way of the interior of itself and a drive unit rotating it for delivering the washing fluid further to a target by spraying or in a like manner through nozzles present in the wash pipe.

Especially in solutions of the above type it is inconvenient to execute the washing process for a process apparatus, which proceeds, according to the principle shown e.g. in FIG. 5, in several longitudinal directions. At present, such a washing process requires that several spaced-apart wash pipes, along with drive units and washing fluid pipeworks therefore, be mounted on various surfaces of a process apparatus.

For example, Finnish patent No. 107,589 discloses another method and apparatus intended for process washing, according to the principle of which at least two washing fluid supply systems are arranged by way of the interior within one and the same wash pipe for enabling operation of each supply system, such as spraying of washing fluid and/or movement of the supply system, by means of a control assembly in a manner independent from each other.

Accordingly, it is inconvenient today to implement an elongated pipeline, especially as a process washing apparatus rotating around its longitudinal axis, having a mobility in several directions or else in anticipation of its required mobility, e.g. due to maintenance operations applied to the actual process apparatus . In such cases, the required extra equipment currently results in expensive investments, plenty of necessary service and maintenance operations and required space. The above problems are further acerbated when using e.g. process washing lines according to the above-cited Finnish patent, comprising at least two flow paths nested within and separated from each other for process washing fluid.

SUMMARY OF THE INVENTION

A pipe joint arrangement according to the present invention has an objective to provide a decisive improvement regarding the above-described problems and to thereby raise essentially the available state of the art. In order to accomplish this objective, a pipe joint arrangement of the invention is principally characterized by comprising a joining piece, connectible with pipeline sections to be coupled with each other successively in the longitudinal direction and consisting of frame elements locked to each other in a longitudinal direction and having provided therebetween a swivel member with a substantially cylindrical or spherical swiveling face for enabling movement of the frame elements by rotating the same relative to each other with respect to one or more axes of rotation.

In amongst the most important benefits gained by a pipe joint arrangement of the invention should be mentioned the simplicity of its construction and the advantages resulting from its use, regarding especially reduced investment costs and less service and maintenance operations. The swivel member with a substantially cylindrical or spherical swiveling face makes it possible to change the relative longitudinal direction of pipelines coupled with a joining piece of the invention either in a single plane relative to one axis of rotation or else three-dimensionally e.g. relative to two axes of rotation orthogonal to each other. By virtue of the invention, it is thus very easy to install pipelines, which extend e.g. in several directions and which are further possible to implement in constructions rotating around their longitudinal axis by using preferably a joining piece designed in universal joint principle and by supplying the washing fluid to be carried along the pipeline by way of the interior of the joining piece by means of a flow passage present in its swivel member and connected by its opposite ends in a sealed manner to flow paths present in the opposite frame elements of the frame. As a result, the pipe joint arrangement of the invention enables first of all implementation, of integrally constructed, multidirectional pipelines e.g. in process washing purposes or else installation of various pipelines to render it possible to displace the same by flexing relative to one or more articulations e.g. when such a displacement is required by service or maintenance operations applied to the actual process apparatus.

BRIEF DESCRIPTION OF THE DRAWINGS

The invention will be described in detail in the following specification with reference to the accompanying drawings, in which.

DETAILED DESCRIPTION OF EMBODIMENTS OF THE INVENTION

The invention relates to a pipe joint arrangement, which is intended for enabling one or more angular deflections successive in a longitudinal direction s along an elongated pipeline L in one or more planes . The pipe joint arrangement comprises, e.g. according to the principle shown in FIGS. 5a and 5b, a joining piece 1, connectible with pipeline sections to be coupled with each other successively in a longitudinal direction s1 and consisting of frame elements 1a, 1b locked to each other in the longitudinal direction s and having provided therebetween a swivel member 2 with a substantially cylindrical or spherical swiveling face for enabling movement of the frame elements 1a, 1b by rotating w the same relative to each other with respect to one or more axes of rotation.

Figure 4A:
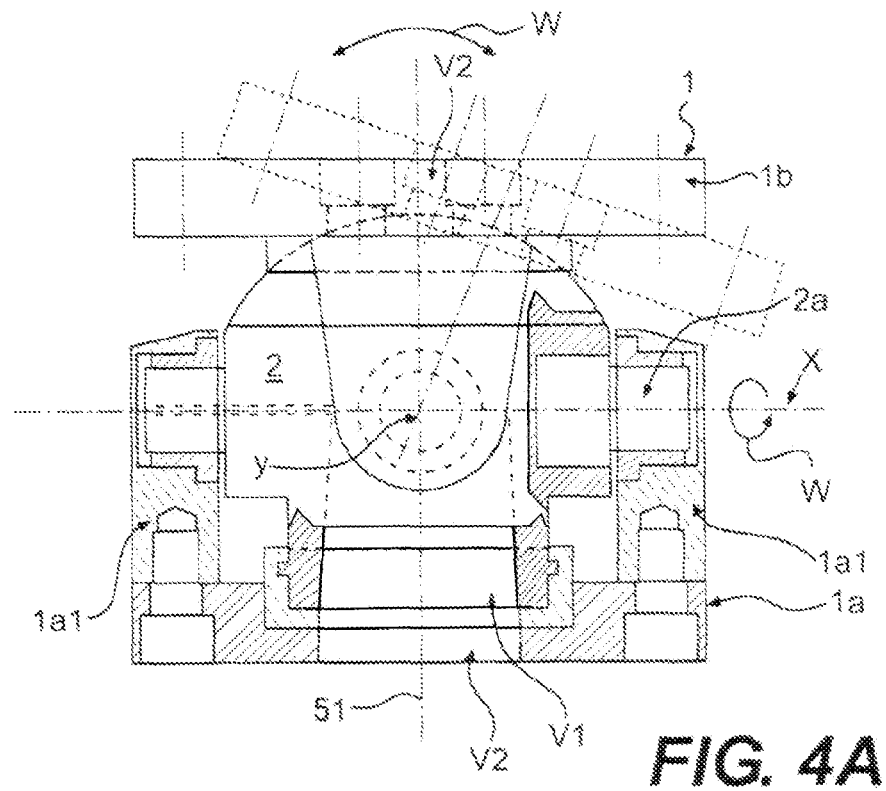
Figure 4B:
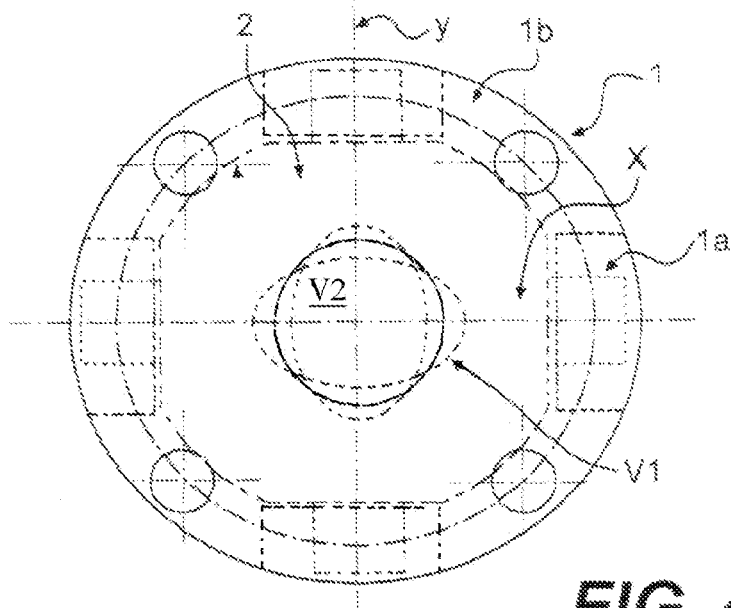

FIGS. 1a and 1b, 2a and 2b, and 3a and 3b illustrate solutions pivotable symmetrically with respect to two axes of rotation x, y orthogonal to each other, wherein the swivel member 2 comprises a spherical swiveling face. On the other hand, the solution shown in FIGS. 4a and 4b makes use of a solution pivotable relative to just one frame element 1b with respect to two axes of rotation x, y, the other frame element 1a being capable of pivoting with respect to the x-axis only. In a further preferred embodiment, especially in reference to what is shown in FIG. 4b, it is possible to design the flow passage V1 present in the swivel member 2 to be e.g. elliptically broached from its mid-section to the outer periphery of the swivel member 2 in a direction consistent with the sense of rotation. Another possibility is to implement the joining piece in a manner enabling rotation relative to just one axis of rotation by using a swivel member 2 which either symmetrically or asymmetrically cylindrical, the latter principle being shown e.g. in FIG. 4a.

Referring e.g. to views of principle shown e.g. in FIGS. 5a and 5b, in a particularly preferred embodiment the pipe joint arrangement is intended for use in connection with a process washing apparatus intended particularly for process washing, whereby a process apparatus included in an industrial process, such as in the basic equipment of a pulp or paper mill, is washable by means of a pipeline L, which is movable relative thereto, functions as a washing apparatus, and which is coupled to be movable in connection with the process apparatus for spraying a washing fluid to the target by way of nozzles sp present in the pipeline L or in a like manner while the pipeline is rotating u around its longitudinal axis s in response to the action of a drive unit KL. In this case, the pipe joint arrangement has its joining piece 1 implemented preferably in a so-called cardan principle, such as e.g by means of a universal joint, a cross-joint, an articulated coupling or the like, wherein its internal flow path is established by a flow passage V1 present in the swivel member 2 and connected, e.g. in reference to FIGS. 1a, 2a, 3a and 4a, by its opposite ends in a sealed manner to flow paths V2 present in the opposite frame elements 1a, 1b.

Figure 1A:
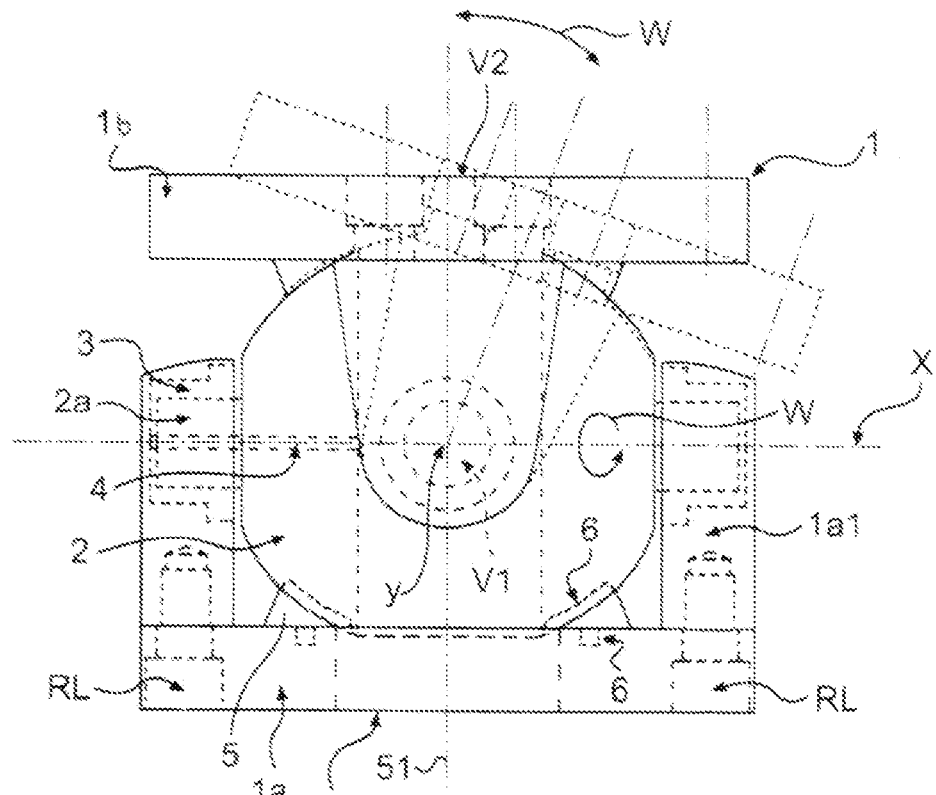
FIGS. 1a and 1b show longitudinal and cross-sectional views of one preferred joining piece of the invention.
Figure 1B:
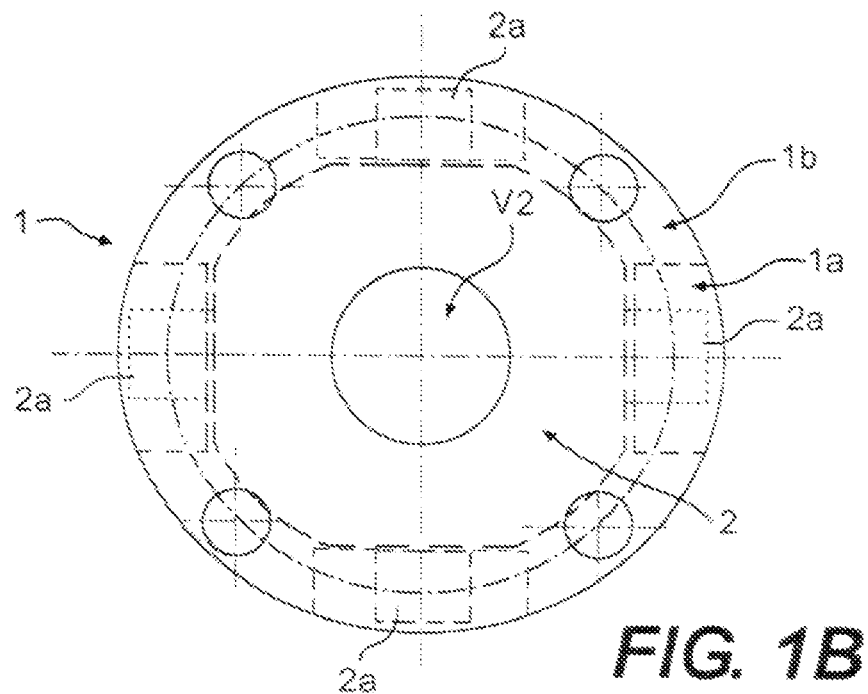
Figure 2A:
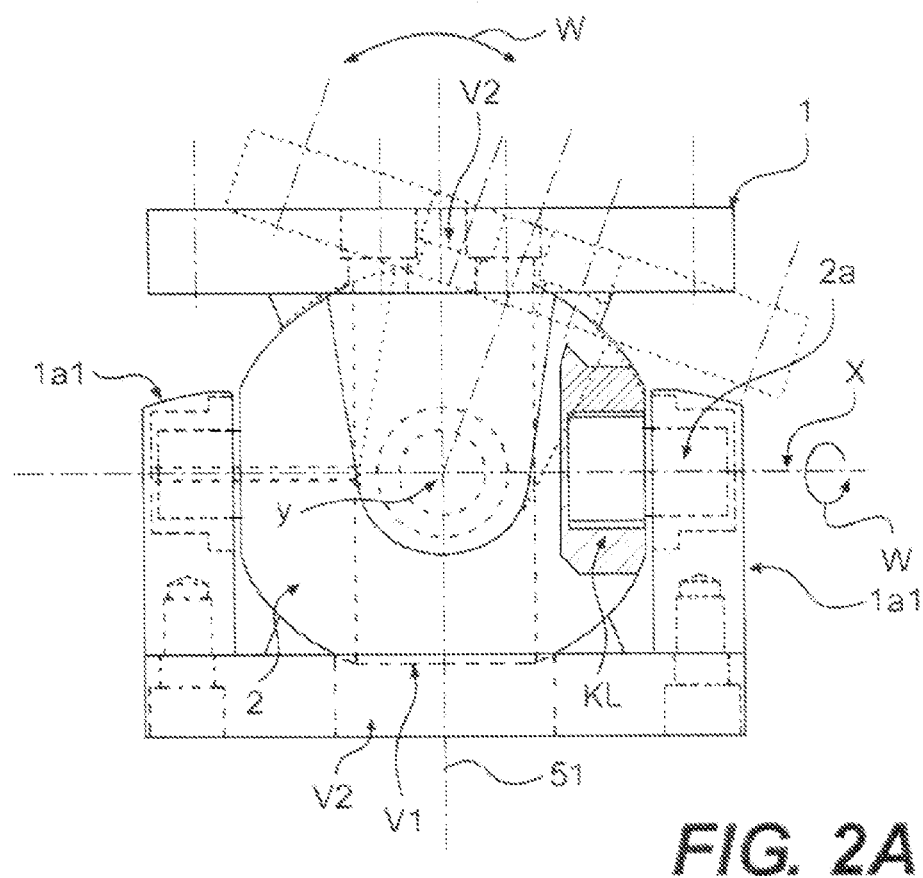
FIGS. 2a and 2b show one joining piece which is alternative to that shown in FIGS. 1a and 1b, FIGS. 3a and 3b show another implementation which is alternative to those shown in FIGS. 1 and 2, FIGS. 4a and 4b show another implementation which is alternative to the embodiments shown in FIGS. 1-3, and FIG. 5 show side and plan views of pipe joint arrangements of the invention when used in connection with a process washer pipe system capable of rotating around its longitudinal axis.
Figure 2B:
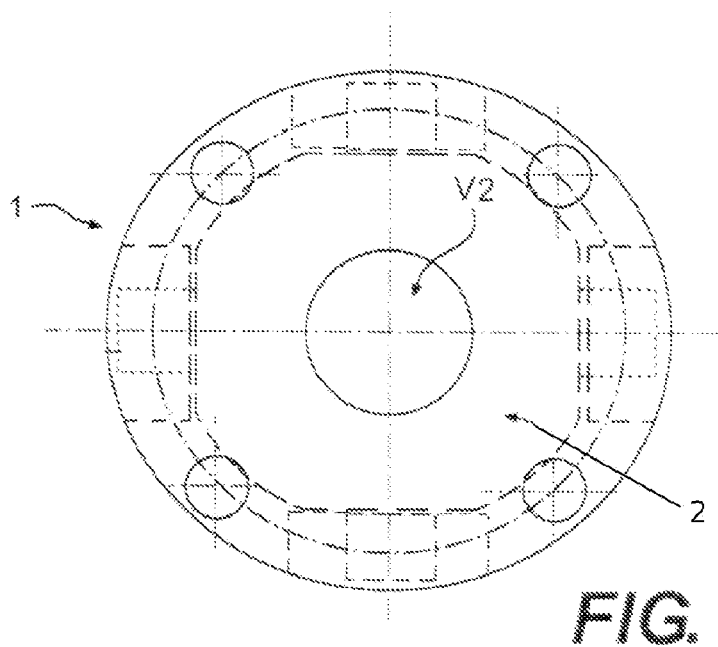
Figure 3A:
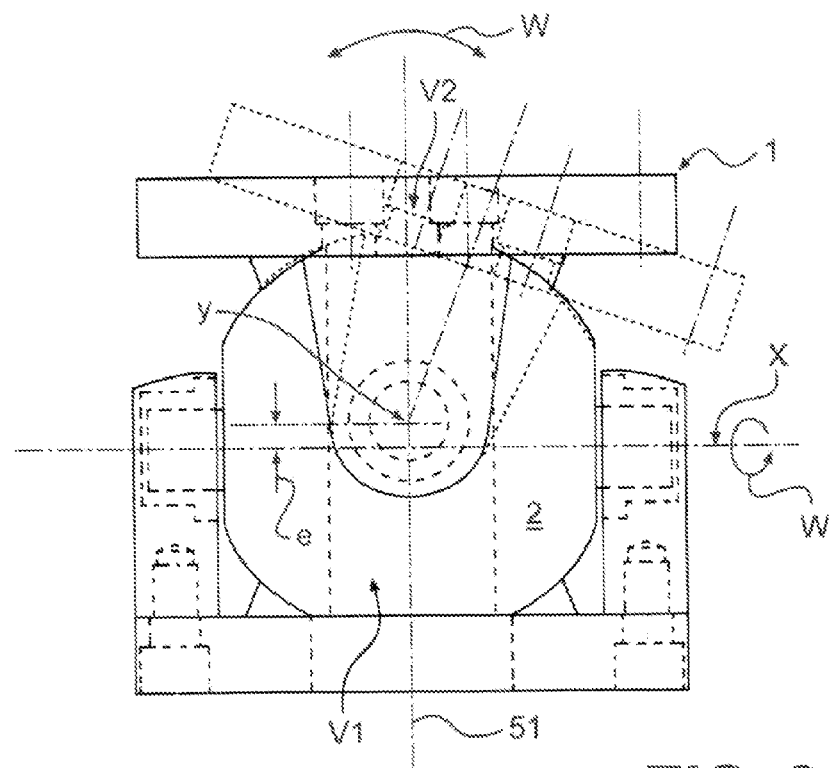
Figure 3B:
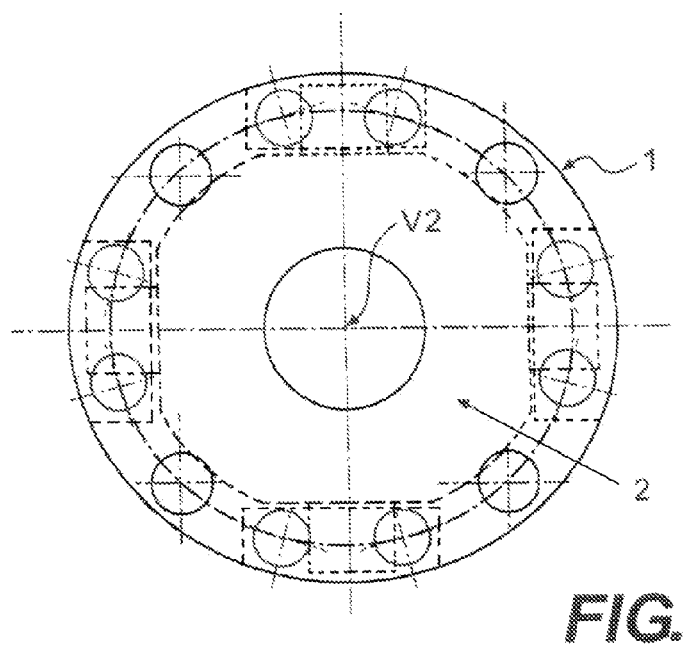

In a preferred embodiment, referring especially to FIGS. 1a and 1b, the joining piece L includes a substantially spherical or ball-shaped swivel member 2, which is connected by its opposite sides to each frame element 1a, 1b by means of locking/pivoting axles 2a located in two planes orthogonal to each other. Especially in the embodiment shown in FIGS. 3a and 3b, the pairs of locking/pivoting axles located in orthogonal planes are disposed partially eccentrically e with respect to the swivel member 2.

In a preferred embodiment, the swivel member 2 has a bearing 3 disposed between its locking/pivoting axle 2a and frame elements 1a, 1b, the frame elements 1a, 1b being also preferably provided with lubrication channels 4 for lubricating the articulation bearings 3.

In all of the foregoing embodiments, the swivel member 2 and the locking/pivoting axles 2a are preferably designed as a substantially integral fixed unit. In particular, the embodiment shown in FIGS. 2a and 2b comprises the use of locking/pivoting axles 2a connectible to the swivel member 2 by means of a threaded joint KL, while the other foregoing respective embodiments enable the use of locking/pivoting axles 2a attached to the swivel member 2 e.g. by welding. In embodiments like this, each frame element 1a, 1b comprises at least one attachment bracket 1a1 engageable therewith removably, such as by way of a screw joint RL, for enabling attachment of the swivel member 2 with its integral fixed locking/pivoting axle 2a. Assembling a joining piece constructed as described above is a particularly simple procedure.

In a further preferred embodiment, each frame element is provided, in connection with its flow path V2, with an external sealing means 5 setting itself against the swivel member 2. In a still further solution alternative or supplementary to the above, each frame element 1a, 1b and/or the swivel member (2) is provided, according to the principle shown eg. in FIG. 1a, with one or more additional internal seals 6.

A pipe joint arrangement of the invention is capable of being applied also in implementations, wherein a pipeline L is provided in its interior with at least two spaced-apart flow systems for a washing process. In this case, the pipeline L has its first internal flow system extended by way of a flow path V2 present in a frame element of a joining piece 1 and a flow passage V1 present in a swivel member 2 through the joining piece 1, the second internal flow system being extended e.g. externally of the joining piece 1 by means of one or more by-pass conduits, tubes or the like (this type of embodiment is not shown in the drawings).

It is obvious that the invention is not limited to the embodiments illustrated or described above, but it can be subjected to quite extensive modifications within the scope of the basic inventive concept. Thus, it is obvious that a joining piece of the invention, regarding both the configurations of a swivel member and its articulation faces as well as its external construction, can be implemented in a multitude of designs by providing one or more frame elements of the joining piece, for the purpose of coupling the swivel member, for example with no more than one or else three or more attachment brackets. Furthermore, in a totally asymmetrical implementation, it is also possible to design the swivel member as an integral part of one of the frame elements of a joining piece, whereby the desired angular deflection is accomplished merely by rotating the second frame element of the joining piece relative to the first one in one or more planes. There is no detailed description above regarding the actual coupling of pipelines with a joining piece, which can also be implemented, eg. in principle, in designs other than those shown in FIG. 5. In addition, it is naturally possible to employ a joining piece of the invention by using it just to provide an angular deflection in a pipeline, whereby a fluid conveyed along the pipeline is adapted to by-pass the joining piece e.g. by way of an external flow tube or an external folding jacket.

The invention claimed is:
1. A pipe joint arrangement for connecting a plurality of pipeline sections to permit at least one successive angular deflection in a longitudinal direction in at least one plane along the pipeline sections, the pipe joint comprising:
   a joining piece comprising two frame element pieces configured to be connected to ends of the pipeline sections, the frame element pieces being locked to each other in a longitudinal direction, each frame element having a flow path extending therethrough;
   a swivel member having an at least partially spherical outer surface;
   locking and pivoting axles attached to the swivel member and extending in two orthogonal directions, the locking and pivoting axles operatively connecting the swivel to the joining piece; and a flow passage extending through the swivel member operatively connected to the flow paths of the frame element pieces wherein the swivel member and the locking/pivoting axles are an integral fixed unit, and wherein each frame element comprises at least one attachment bracket removably engageable therewith and configured to attach the swivel member with one of the integral fixed locking/pivoting axles.

2. The pipe joint arrangement according to claim 1, wherein the swivel member enables rotary motion around the axes of rotation.

3. A pipe joint arrangement for connecting a plurality of pipeline sections to permit at least one successive angular deflection in a longitudinal direction in at least one plane along the pipeline sections, the pipe joint comprising:
 a joining piece comprising two frame element pieces configured to be connected to ends of the pipeline sections, the frame element pieces being locked to each other in a longitudinal direction, each frame element having a flow path extending therethrough;
 a swivel member having an at least partially spherical outer surface;
 locking and pivoting axles attached to the swivel member and extending in two orthogonal directions, the locking and pivoting axles operatively connecting the swivel to the joining piece; and
 a flow passage extending through the swivel member operatively connected to the flow paths of the frame element pieces,
 wherein the flow passage extending through the swivel member is adapted to broach elliptically from a middle portion to an outside periphery of the swivel member in a direction of rotation of the swivel member.

4. A pipe joint arrangement for connecting a plurality of pipeline sections to permit at least one successive angular deflection in a longitudinal direction in at least one plane along the pipeline sections, the pipe joint comprising:
 a joining piece comprising two frame element pieces configured to be connected to ends of the pipeline sections, the frame element pieces being locked to each other in a longitudinal direction, each frame element having a flow path extending therethrough;
 a swivel member having an at least partially spherical outer surface;
 locking and pivoting axles attached to the swivel member and extending in two orthogonal directions, the locking and pivoting axles operatively connecting the swivel to the joining piece; and
 a flow passage extending through the swivel member operatively connected to the flow paths of the frame element pieces,
 wherein the joining piece comprises articulation bearings arranged between each locking/pivoting axle and the frame elements.

5. The pipe joint arrangement according to claim 4, wherein the frame elements comprise lubrication channels for lubricating the articulation bearings.

6. A pipe joint arrangement for connecting a plurality of pipeline sections to permit at least one successive angular deflection in a longitudinal direction in at least one plane along the pipeline sections, the pipe joint comprising:
 a joining piece comprising two frame element pieces configured to be connected to ends of the pipeline sections, the frame element pieces being locked to each other in a longitudinal direction, each frame element having a flow path extending therethrough;
 a swivel member having an at least partially spherical outer surface;
 locking and pivoting axles attached to the swivel member and extending in two orthogonal directions, the locking and pivoting axles operatively connecting the swivel to the joining piece; and
 a flow passage extending through the swivel member operatively connected to the flow paths of the frame element pieces,
 wherein each frame element comprises an external seal setting against the swivel member to seal the flow path through each frame element.

7. A pipe joint arrangement, for connecting a plurality of pipeline sections to permit at least one successive angular deflection in a longitudinal direction in at least one plane along the pipeline sections, the pipe joint comprising:
 a joining piece comprising two frame element pieces configured to be connected to ends of the pipeline sections, the frame element pieces being locked to each other in a longitudinal direction, each frame element having a flow path extending therethrough;
 a swivel member having an at least partially spherical outer surface;
 locking and pivoting axles attached to the swivel member and extending in two orthogonal directions, the locking and pivoting axles operatively connecting the swivel to the joining piece;
 a flow passage extending through the swivel member operatively connected to the flow paths of the frame element pieces; and
 at least one internal seal arranged between each frame element and swivel member to seal the flow path through each frame member.

8. A pipe line arrangement, comprising:
 a plurality of pipeline sections to be coupled with each other successively in a longitudinal direction; and
 a joint arrangement for connecting the plurality of pipeline sections to permit at least one successive angular deflection in a longitudinal direction in at least one plane along the pipeline sections, the pipe joint comprising
  a joining piece comprising two frame element pieces configured to be connected to ends of the pipeline sections, the frame element pieces being locked to each other in a longitudinal direction, each frame element having a flow path extending therethrough;
  a swivel member having an at least partially spherical outer surface;
  locking and pivoting axles attached to the swivel member and extending in two orthogonal directions, the locking and pivoting axles operatively connecting the swivel to the joining piece; and
  a flow passage extending through the swivel member operatively connected to the flow paths of the frame element pieces,
  wherein the swivel member and the locking/pivoting axles are an integral fixed unit, and wherein each frame element comprises at least one attachment bracket removably engageable therewith and configured to attach the swivel member with one of the integral fixed locking/pivoting axles.

9. The pipe line arrangement according to claim 8, further comprising;
 a washing apparatus configured to wash an industrial process apparatus, wherein the pipe line is movable relative to the industrial process apparatus; and
 nozzles for spraying a washing fluid while the pipe line rotates around a longitudinal axis.

10. The pipe line arrangement according to claim 8, wherein the pipe line arrangement includes at least two spaced-apart flow systems for the washing apparatus.

11. The pipe line arrangement according to claim 8, further comprising:

a first flow system extending between one flow path in one of the frame elements of the joining piece and the internal flow passage in the swivel member.

12. The pipe line arrangement according to claim 11, further comprising:

a second flow system extending externally of the joining piece by at least one by-pass conduit or tube.

* * * * *